United States Patent [19]
Magee

[11] Patent Number: 5,644,431
[45] Date of Patent: Jul. 1, 1997

[54] DIRECTIONAL IMAGE TRANSMISSION SHEET AND METHOD OF MAKING SAME

[75] Inventor: John Allan Magee, Fayetteville, Ark.

[73] Assignee: University of Arkansas, N.A., Little Rock, Ark.

[21] Appl. No.: 227,055

[22] Filed: Apr. 13, 1994

Related U.S. Application Data

[63] Continuation-in-part of Ser. No. 948,109, Sep. 21, 1992, Pat. No. 5,303,525, and Ser. No. 779,646, Oct. 21, 1991, which is a continuation-in-part of Ser. No. 524,975, May 18, 1990, abandoned, said Ser. No. 948,109, is a continuation of Ser. No. 524,975.

[51] Int. Cl.$^6$ ........................................... G02B 27/10
[52] U.S. Cl. ........................................... 359/619; 359/455
[58] Field of Search ..................................... 395/619, 623, 395/454, 455, 456

[56] References Cited

U.S. PATENT DOCUMENTS

| | | | |
|---|---|---|---|
| 1,943,995 | 1/1934 | Weld | 359/619 |
| 3,002,051 | 9/1961 | Tait | 359/455 |
| 3,653,138 | 4/1972 | Cooper | 40/130 R |
| 4,021,945 | 5/1977 | Sussman | 40/28 |
| 4,208,086 | 6/1980 | Perry | 359/744 |
| 4,867,514 | 9/1989 | Waldron | 359/744 |
| 5,270,859 | 12/1993 | Wirth et al. | 359/744 |

*Primary Examiner*—Georgia Y. Epps
*Assistant Examiner*—Thomas Robbins
*Attorney, Agent, or Firm*—Robert R. Keegan; Head, Johnson & Kachigian

[57] ABSTRACT

There is disclosed a partially transparent, directional viewing sheet formed of plastic material with lenses, preferably lenticular lenses, formed on both the front and the back surfaces of the sheet, there being on at least one of the surfaces intervening spaces between the lenses which spaces are not fully transparent and may be imprinted with an image that is viewable through the sheet from some directions. Preferably such lenses separated by non-transparent intervening spaces are concave lenses with a radius of curvature which is less than the radius of curvature of convex lenses, on the other surface, causing the concave lens focal length to be less than, typically about one-half of, the focal length of the convex lenses. The thickness of the sheet and hence the spacing between each concave lens and a corresponding convex lens causes the lenses axial spacing to be about the difference in focal lengths of the lenses producing the effect of a tiny Galilean telescope. The view through such a sheet in a direction substantially aligned with the optical axis of the tiny telescope is a minimally distorted view of objects distant from or near to the opposite side of the sheet while off-axis viewing will present the image imprinted on the intervening spaces between the concave lenses on the back surface of the sheet. Alternative embodiments employ intrusive mask elements between concave lens elements facilitating use for directional control of solar energy while maintaining image transmission for one direction of viewing.

19 Claims, 6 Drawing Sheets

DIRECTIONAL IMAGE TRANSMISSION SHEET AND METHOD OF MAKING SAME

This application is a continuation-in-part of application titled: SIDING OR ROOFING EXTERIOR PANELS FOR CONTROLLED SOLAR HEATING, Serial No. 07/948,109, filed Sep. 21, 1992, U.S. Pat. No. 5,303,525, which is a continuation of application titled SIDING OR ROOFING EXTERIOR PANELS FOR CONTROLLED SOLAR HEATING, Serial No. 07/524,975, filed May 18, 1990, now abandoned, and this application is a continuation-in-part of application titled SOLAR ENERGY CONTROL FILM AND PROCESS, Serial No. 07/779,646, filed Oct. 21, 1991, which is a continuation in part of application titled SIDING OR ROOFING EXTERIOR PANELS FOR CONTROLLED SOLAR HEATING, Serial No. 07/524,975, filed May 18, 1990, now abandoned.

BRIEF SUMMARY OF THE INVENTION

The present invention relates to transparent or semi-transparent sheets which are configured to transmit certain light: energy or images having certain directions of propagation while reflecting, absorbing, or modifying images or energy from other directions. Such sheet material is useful for producing panels for controlled solar heating as described in my prior applications identified above and has further uses, for example, in controlling light transmission in building windows, in greenhouses, for computer display screens, and in imprinted packaging film. The relevant portions of the description of my previous applications identified above is incorporated herein by reference.

It has long been known to incorporate lenticular lenses in a surface of thin plastic sheet material and to place a printed image on the opposite surface of the sheet material arranged so that the apparent image as viewed from different directions depends upon the direction of viewing with three or more different images being presented to the viewer as the direction of viewing changes. Such sheet materials have been used to produce moving image novelties and to produce stereoscopic effects and three-dimensional illusions. It has also been known to produce partially transparent film material having opaque striations formed within the sheet to produce the effect of louvers within the transparent sheet material. Such louver simulating material has a high transmission coefficient for light energy in certain directions while having a very low or near-zero light transmission coefficient for other directions. The louver simulating sheet material could have louvers of light absorbing or light reflecting composition. Examples of such prior devices for directional transmission of light energy and images are shown in U.S. Pat. No. 3,653,138 (U.S. Cl. 40/130R) and U.S. Pat. No. 4,021,945 (U.S. Cl. 40/28C). Other patents disclosing lenticular lens arrays are cited as references in U.S. Pat. No. 5,303,525.

According to the present invention, a transparent or partially transparent sheet material is provided which has lenses formed on both the front surface and the back surface of the sheet. In the preferred embodiments the lenses on one of the surfaces will have a larger radius of curvature (and a longer focal length) than the lenses on the other surface. Also in the preferred embodiments the lenses with the larger radius of curvature will substantially cover the surface on which they are formed with substantially no intervening flat surfaces while the lenses with the smaller radius of curvature will also have a smaller aperture, and, as they are equal in number to the larger lenses, there will be a space between the small radius lenses which will normally be a smooth flat surface. This flat surface may occupy approximately half the area of the sheet on one side and may be imprinted by generally conventional printing techniques with a desired monochrome or multi-color image, for example, one suitable for packaging film or incorporation in a product package. As will later be explained, the preferred embodiment of the directional image transmission sheet is capable of presenting an effectively transparent characteristic with a high transmission coefficient and low distortion for viewing from one direction, such as perpendicular to the sheet. When viewed from another direction, such as at a side angle of 45°, the sheet does not appear to be transparent, but rather the printed matter on the back surface of the sheet is visible substantially without distortion.

In addition to providing the features and advantages discussed above, it is an object of the present invention to provide a thin transparent plastic sheet material having convex lenses embossed or otherwise formed in a first surface thereof which match one-to-one with lenses embossed or otherwise formed in the back surface of the sheet with the radii of curvature of the lenses being determined to cause the focal point of each lens on the first surface to substantially coincide with the focal point of the corresponding lens on the back surface whereby a telescope effect is produced allowing images to be viewed through the sheet material substantially without distortion from a direction perpendicular or nearly perpendicular to the sheet material.

It is another object of the present invention to provide such a sheet material wherein the lenses on the front surface of the sheet are convex, and the lenses on the back surface of the sheet are concave having a radius of curvature of no greater than about two-thirds the radius of curvature of the convex lenses.

It is still another object of the present invention to provide such a sheet material wherein the lenses are elongated lenticular lenses arranged in a parallel fashion and wherein the width of the lenses about equal to or is less than one millimeter (about 0.04 inches).

It is yet another object of the present invention to provide such a sheet material wherein the lenses on the back surface are concave and of substantially less width than those on the front surface so that there are intervening spaces between the concave lenses and such surfaces are flat and adapted to be imprinted with a solid color or an information imparting pattern which may be viewed from oblique angles from the front surface of the sheet material.

BRIEF DESCRIPTION OF THE DRAWINGS

Other objects and advantages of the present invention will be apparent from consideration of the following description in conjunction with the appended drawings in which.

DETAILED DESCRIPTION

Figure 1:
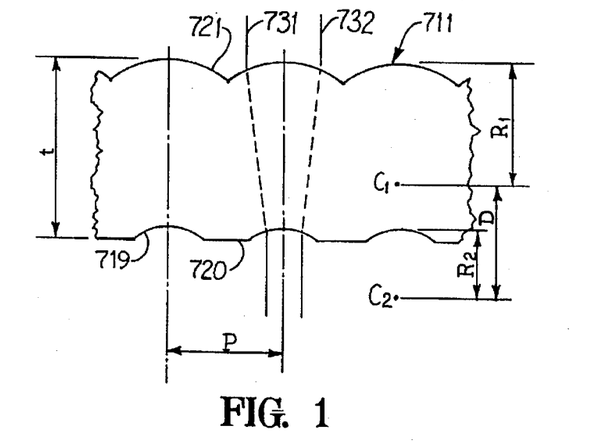
FIG. 1 is a greatly enlarged sectional view of an image transmission sheet material according to the invention.
Figure 2:
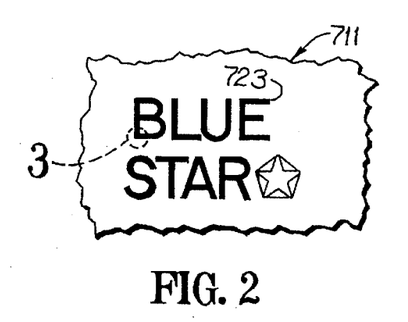
FIG. 2 is a top plan view of sheet material as shown in FIG. 1, having advertising graphic material imprinted thereon.
Figure 3:
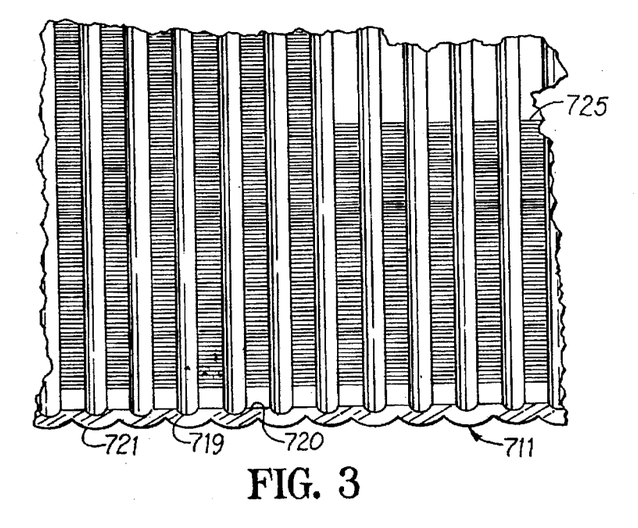
FIG. 3 is a greatly enlarged perspective view from the bottom of the material of FIG. 2, showing the area indicated by 3 in FIG. 2.

Referring to the drawings and particularly FIGS. 1, 2, and 3, a sheet material 711 is shown which is formed of transparent plastic material which may be very flexible, somewhat rigid, or very rigid. Plastic materials that may be employed include polyvinyls, acrylics, or other forms of polymerized organic compounds. While organic plastic composition is preferred for the sheet material 711, it would be possible to implement the invention with sheet material formed of glass, or other non-plastic materials. The primary uses of the invention involve visible light, but its use with infrared or ultraviolet light is not precluded.

The top or first surface of the material 711 has converging lenses 721 formed therein as smooth convex cylindrical protuberances in 21. The bottom or back surface of the sheet material 711 has indentations 719 formed therein which are smooth, concave, cylindrical surfaces acting as diverging lenticular lenses.

The lenses 719 are registered with lenses 721 and in the example of FIG. 1, lenses 719 are optically coaxial with lenses 721. Lenses 719 are of lesser width than lenses 721 and the spaces between lenses 719 resulting from this lesser width are generally flat or planar surface portions 720.

In FIG. 1 certain dimensions and locations are assigned reference letters for convenience in explaining the inventions. The overall thickness of the sheet material 711 is designated by t. The center to center spacing of the lenses 721 which is also the center to center spacing of the lenses 719 is designated P. The lenses 721 and 719 in FIG. 1 are illustrated as being cylinders having circular arc configurations, but it will be understood that more complex shapes such as elliptical cylinder shapes or other non-circular shapes could be employed in accordance with known optical techniques.

In FIG. 1 the center of curvature of the circular surface of one of the lenses 721 is indicated at $C_1$. The center of curvature of the corresponding concave lens 719 circular surface is indicated at $C_2$. The corresponding radii of curvature are indicated by reference letters $R_1$ and $R_2$. The focal point for the lenses 721 and 719 substantially coincide and are indicated at f in FIG. 1. In accordance with known optical principles the focal length and focal point may be determined from the effective radii of curvature $R_1$ and $R_2$ and the index of refraction of the material of which sheet 711 is formed.

Also illustrated in FIG. 1 is the fact that parallel rays of light indicated at 731 and 732 which are caused to converge by lenses 721 will be caused to diverge by lenses 719 by just the amount necessary to restore them to parallelism. This is a consequence of the fact that focal points of the lenses 719 and 721 are approximately coincident.

Figure 4:
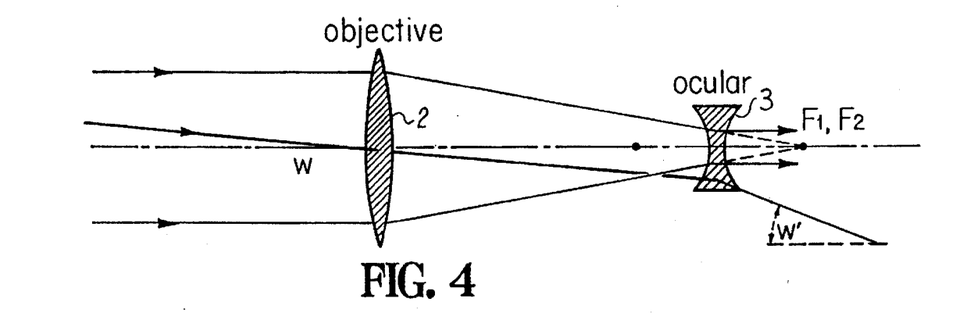
FIG. 4 is an illustration of a prior art Galilean telescope useful in explaining the invention.

The optical characteristics and functions of the transparent sheet material illustrated in FIG. 1 can more readily be under,stood by considering the schematic diagram of a Galilean telescope shown in FIG. 4. A Galilean telescope normally comprises a single converging objective convexo-convex lens 2 and a single diverging ocular convexo-concave lens 3. When used as a telescopic viewing device the arrangement in FIG. 4 would view an object far to the left with the viewer's eye placed relatively close at the right of ocular lens 3. For focusing on an object at infinity (a relatively great distance) the distance between the objective lens and ocular lens is adjusted so that the focal point of the objective lens ($F_1$) substantially coincides with a point $F_2$ at a distance from the ocular lens equal to the focal length of the ocular lens.

The Galilean telescope provides a limited amount of image magnification equal to the ratio of the longer focal length of the objective lens to the shorter focal length of the ocular lens. This is indicated in FIG. 4 where a ray designated 4 from a distant point is shown to have an angle of incidence W at the objective which after passing through objective 2 and ocular 3 has a substantially greater angle W. The Galilean telescope has a disadvantage of low magnification, but has the advantage of producing an erect image rather than an inverted image. Neither the degree of magnification of the Galilean optical system nor the fact that is presents an erect image is of particular importance in regard to the present invention.

The Galilean telescope has another characteristic which is important, however. The position of the object being viewed and the eye of the viewer can be reversed from that previously described so that the viewers eye is to the left of the objective and the object to be viewed is to the right of the ocular. In this situation particularly, the distance of the eye of the viewer from the objective 2 is of little consequence. When objects are viewed in reverse fashion through the Galilean telescope, the image is diminished rather than magnified, but as will be seen, this is not significant as respects the present invention. It should be pointed out that Galilean telescopes have normal circular lenses whereas the lenses that are described relative to FIGS. 1, 2, and 3, are lenticular lenses. Thus, the optical effects described above are observed in only one dimension, and in the dimension at right angles to that one dimension there is essentially no convergence or divergence, or other optical effect for angularly incident rays.

Referring now particular to FIGS. 2 and 3, FIG. 2 shows the appearance of a large area of sheet 711 on which there has been imprinted an image 723. The image 723 may be any type of decorative or informative graphic or textual information; in FIG. 2 it is represented as product identification as might be used in sheet material used for packaging film. FIG. 2 represents the appearance of sheet material 711 when viewed from a direction that will cause the image 723 imprinted on the back of sheet material 711 to be visible.

FIG. 3 is a perspective view of a greatly enlarged fragmentary portion of the sheet material indicated by the dashed circle and identifying numeral 3 in FIG. 2. In addition to showing the convex lens surfaces 721, the concave lens surfaces 719, and the intervening flat surfaces 720, imprinting 725 is shown which produces the image 723 seen in FIG. 2 as will be explained hereinafter. It will be noted that the imprint 725 on sheet material 711 is only laid down on portions of the intervening flat surfaces 720. It will usually be desired to print that portion of the flat surfaces 720 not within imprint 725 with a white pigment or other background shade or color. Conventional plastic film printing equipment and techniques may be used for imprinting of sheet material 711 if it is thin and flexible film suitable for packaging.

Although it is believed that the function and operation of the directional image transmission sheet 711 is apparent from the previous description, the function may be more fully explained as follows. The convex lenticular lenses 721 and the concave lenticular lenses 719 are proportioned with respect to radius of curvature and are spaced apart by a distance that relates to the index of refraction of the transparent material of sheet 711 in a way such that each pair of lenses 721 and 719 functions in a manner similar to a Galilean telescope (usually, but not always, one focused at infinity).

In FIG. 1 the center for the circular or near-circular arc of one of the lenses 721 is indicated at $C_1$ and the center of curvature of the arc of one of lenses 719 is indicated at $C_2$. In the embodiment illustrated in FIG. 1 the focal points of lenses 721 coincide with the focal points of lenses 719 and one such coincident focal point is indicated at f. It is notable that while one might think it desirable to have the centers of curvature for lenses 721 and 719 be coincident, this has been in fact found to be undesirable and substantially inoperative for indices of refraction of common material.

Certain useful dimensions are labeled in FIG. 1 with the thickness of sheet material 711 at its thickest points being designated t, the effective radius of curvature of lenses 719 being designated $R_2$, and the radius of curvature of lenses 721 being designated $R_1$. The center-to-center distance or pitch of the lenses 721 (and also of the lenses 719) is designated P. The distance between centers of curvature $C_1$ and $C_2$ is designated D.

Table 1 hereinbelow gives exemplary dimensions for the sheet material embodiment of FIG. 1 and alternative embodiments. The optical function of the sheet material of FIG. 1 is similar to that of a Galilean telescope focused at infinity in that rays indicated at 731 and 732 which enter a lens 721 with parallel directions of propagation are converged within sheet material 711 but are then diverged by a lens 719 whereby they are again rendered approximately parallel.

For some uses of sheet material such as 711, one may prefer that the telescope effect of the lenses 721 and 719 be altered to, simulate a Galilean telescope focused at a closer distance rather than at infinity, and in such case, the lenses 719 and 721 would be spaced farther apart and their focal points would not exactly coincide. To some extent, the lenses 719 and 721 are operative for the invention functions when closer than at coincident focus distance, but this is not usually preferred. Generally lens spacing is preferably from 0.8 to 1.2 times the coincident focus distance.

In FIG. 1 lenses 721 are formed of circular arc cross-section subtending an angle of approximately 60° (plus and minus 30°). In some applications, such as solar energy control film, one may wish to have arcs of cross-section subtend greater angles up to 90° or 120° to achieve a greater range of acceptance angle for the optical arrangement. In other cases one may wish to have the arc of lenses 721 subtend a lesser angle than 60°. It is well known that spherical or cylindrical lenses of circular arc cross-section suffer from a deficiency known as spherical aberration. The effects of spherical aberration become more pronounced when the entry angle relative to optical axis (incidence angle) of light rays becomes greater.

The effects of spherical aberration may be rendered innocuous by limiting the angle of incidence that the system accepts and generally a limitation of plus or minus 10° would suffice to permit the use of circular arc cross-section lenses without observable deficiencies due to spherical aberration.

The adverse effect of spherical aberration arises because the circular arc curve does not provide the appropriate angle of incidence for a ray parallel to and distant from the optical axis with the result that the refraction angle for such rays causes them to have a focal point closer to the lens than for near axial rays, hence causing imperfect focusing. In the optical art aspheric lenses have been developed to greatly reduce the effects; of spherical aberration and such techniques can be employed in the design of the optics of sheet material according to the present invention. The considerations involved with the lenticular lenses illustrated in FIG. 1 and described above are essentially the same as those involved in known lenses of aspheric configuration. Also, as well known in the art, a lens system may comprise spherical and aspheric lenses such that all correction is made in only one lens. It may be preferred to correct the system of lenses 719 and 721 by appropriate aspheric configuration of only concave lens 719.

Although complex mathematical calculations are employed to generate lens curvatures with aspheric properties and such curves may not conform to simple geometric functions, an elliptical curve cross-section is a simple geometric form which may be employed to, in part, alleviate the problem of spherical aberration. Herein the term "elliptical curve or elliptical lens" should be understood to apply generally to arcuate curves altered from pure circular shape to alleviate spherical aberration effects, even when they do not conform strictly to the classic formula of an ellipse.

Ellipsoidal or elliptical-cylinder (aspherical) lens surfaces that may be employed are, for an index of refraction of 1,586, a major to minor axis ratio of 1.29; and for an index of refraction of 1.5 a ratio of 1.34. Suitable elliptical-cylinder lens surfaces for any index of refraction can be calculated by Snell's law and conventional ray tracing techniques.

The discussion above with respect to the convex lenses 721 is generally applicable also to the concave lenses 719. In FIG. 1 the radius of curvature of lenses 719 is one-half that of lenses 721, but the angle subtended by the arc of lenses 719 is approximately the same 60°. Accordingly, lenses 719 occupy only half of the back surface of sheet material 711 and the other area is occupied by the flat intervening spaces 720. Although conventional refracting lenses are disclosed herein, lens-like functions can be obtained with holographic lens based on diffraction phenomena, and substitution of holographic lenses for those specifically disclosed may be feasible and desirable in some circumstances.

From the above discussion and reference to FIGS. 1, 2, and 4, it will be seen that the sheet material of FIG. 1 provides a screen-type optical arrangement which provides a clear image of objects viewed through the sheet material from the top in FIG. 1 when the viewing angle does not exceed 15° to 20°; when the viewing angle exceeds about 20°, the viewer sees instead a magnified representation of the multiplicity of flat spaces 720 imprinted with graphic or textual printing pigment 725. Both in cases of effectively transparent image viewing, and of imprinted mask viewing, the viewed images are condensed in the sense that they are only strip samples of the full image, but the strips are so small and so closely spaced that they give the appearance of a complete image in a manner similar to the lines of a television screen display.

Figure 5:
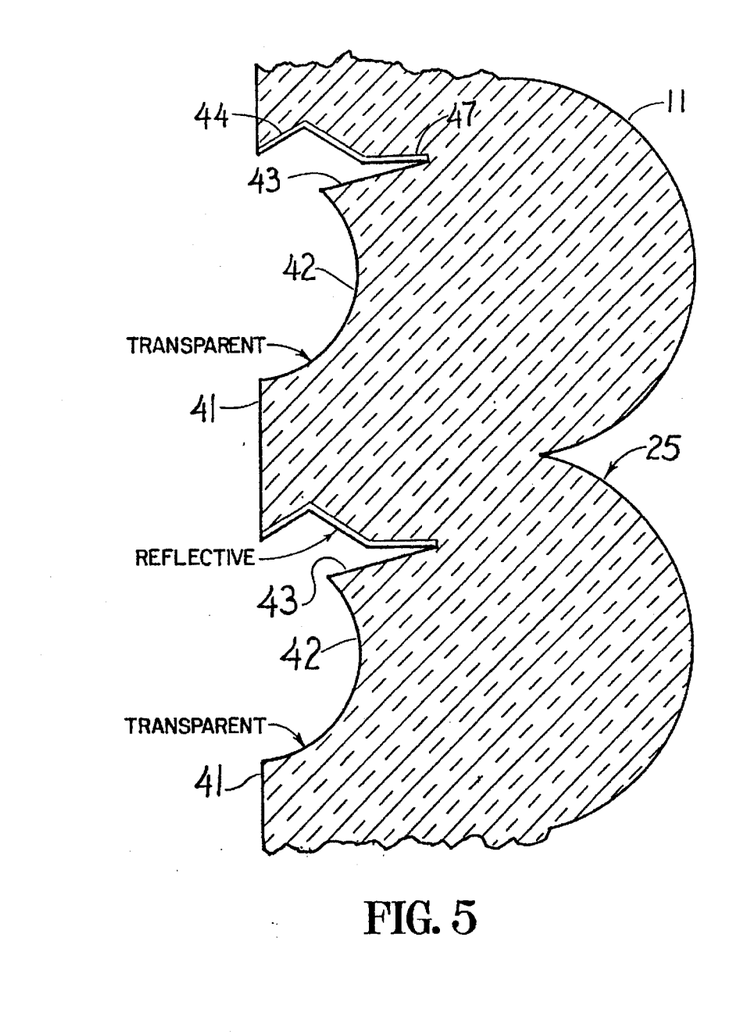
FIG. 5 is a greatly enlarged sectional view of an alternative form of sheet material useful in solar energy control applications.

Referring now to FIG. 5, an alternative embodiment of sheet material 25 is shown which is particularly adapted for solar energy control applications as described in prior application Ser. No. 07/948,109, now U.S. Pat. No. 5,303,525, the relevant subject matter of which is incorporated herein by reference. Sheet material 25 has convex lenses 11 and concave lenses 42 which correspond generally to lenses 719 and lenses 721 in FIG. 1 and FIG. 3. Lenses 11 and 42 in FIG. 5 have arcuate surfaces which subtend a substantially greater angle than in FIG. 1 to enhance the solar energy control properties of the sheet material of FIG. 5. However, only relatively small angular extents of the arcuately curved surface of lenses 42 and 11 cooperate to function in the manner of a Galilean telescope. Accordingly, the problem of spherical aberration with the optical system of FIG. 5 is not severe as it might appear. However, the sheet material of FIG. 5 could also be modified to have lenses 11 and/or lenses 42 of elliptical or other noncircular cross-section to provide an aspherical lens effect and further reduce spherical aberration.

There are intervening flat spaces 41 between lenses 42 in FIG. 5 generally corresponding to flat spaces 720 in FIG. 1. However, it will not generally be desirable to imprint flat spaces 41 with graphic or textual patterns since these may be substantially relied upon to transmit solar radiation for low to moderate sun elevation angles, all as explained in the prior application, Ser. No. 07/948,109, U.S. Pat. No. 5,303,525.

An indentation 43 and sheet material 25 extends more deeply into the sheet material than lenses 42, and therein is located a mask 47 of highly reflective material, such as a paint, ink or coating having a white, substantially opaque pigment. Although the mask 47 is shown as a relatively thin layer, it may have greater thickness or may substantially fill indentation 43. The arrangement illustrated in FIG. 5 includes a mask portion 44 residing at an acute angle with the adjacent flat space 41. This has the effect of increasing the width of the flat spaces 41 and, hence, the size of the window for accepted solar energy, but the mask portions 44 might as well be placed at a right angle or slightly obtuse angle relative to flat spaces 41 to facilitate the formation of sheet material 25 in an embossing or other forming process. As will be apparent from the prior description and from FIG. 5, the sheet material 25 provides the advantage of solar energy control whereby light and solar energy at winter-time low elevation sun angles is allowed to pass through convex lenses 11 and through flat spaces 41 (and possibly lenses 42) whereas at summer-time high elevation sun angles, direct solar energy is intercepted by masks 47 and reflected back out of sheet 25. Thus, solar heating is encouraged and facilitated during winter months and undesired heat loading from solar energy tending to increase air conditioning costs is greatly diminished during summer months. The sheet material of FIG. 5 has the additional advantages described with respect to the sheet material of FIG. 1 in that a viewer whose line of sight is substantially perpendicular to sheet material 25 will have a clear view of objects on the opposite side of the sheet material 25 due to the operation of lenses 11 and 42 in the manner of a Galilean telescope. Sheet material 25 has numerous potential applications such as for windows in residential or other buildings, shop or store windows, computer screens, vehicle windows, and other applications where solar energy control or directional light masking is desired while maintaining the characteristic of image transmission through the sheet material for certain directions. While it is contemplated that the usual arrangement of sheet material 25 would be with the longitudinal axis of the lenticular lenses horizontal as indicated in FIG. 5, windows facing in certain directions might benefit from the application of sheet material 25 with a vertical orientation of the longitudinal axis of lenticular lenses 11 or from an oblique orientation thereof.

It should also be noted that whereas the lenses 42 and 11 in FIG. 5 are represented as being substantially coaxial, they may be shifted in relative position so that the Galilean telescope formed thereby is, in effect, tilted upward or downward by an angle of a few degrees up to approximately 30°. In other words, the optical axes for the lens pairs may be non-perpendicular to the surfaces of the sheet material. It is only necessary that the lenses from one surface be in register with the lenses on the other surface, that is that they have the same relative orientation as to each pair of lenses. Sheet material 711 of FIGS. 1, 2, and 3, may also be modified to shift lenses 719 with respect to lenses 721.

Figure 6:
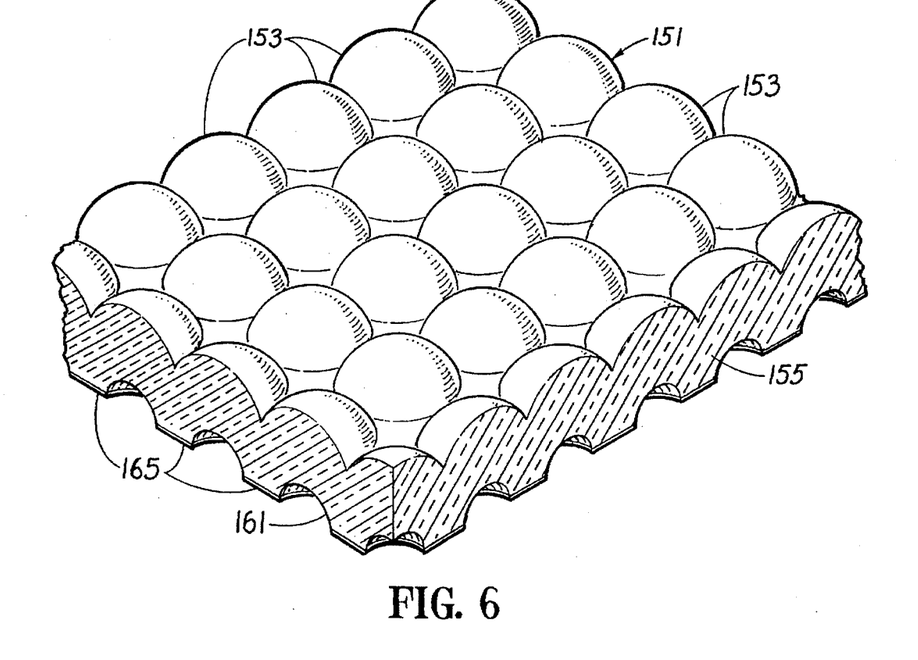
FIG. 6 is a greatly enlarged isometric view of another alternative form of sheet material employing spherical rather than lenticular lenses.

FIG. 6 shows a modification of sheet material according to the present invention which employs spherical, ellipsoidal, or aspherical lenses rather than the lenticular lenses of FIG. 1 or of FIG. 5. Sheet material 151 is provided with a plurality of lenses 153 in the form of spherical segment projections.

These lenses 153 may be arranged in a rectangular array of rows and columns as indicated in FIG. 6 or may be arranged in a hexagonal array. Lenses 153 may have small intervening spaces between them as shown in FIG. 6, or they may overlap and run together with no intervening spaces.

The back side of the sheet material 151 is provided with a rectangular array of concave lenses 161 which are in register with the lenses 153 on the front side. The radius of curvature and the aperture diameters of lenses 161 are approximately half that of lenses 153, leaving intervening spaces 165 between lenses 161 which may optionally be imprinted with a solid color pigment or imprinted with a graphic or textual pattern.

A sheet material of FIG. 6 virtually corresponds to sheet material 711 of FIG. 1 except that the array of lenses is two-dimensional, rather than one-dimensional. The lenses 153 may have a diameter less than one millimeter; the actual appearance of a sheet material, particularly at a distance, will be much different than that perceived in the greatly enlarged view of FIG. 6. The primary functional difference of sheet material 151 relative to sheet material 711 is the fact that its directional characteristics are two-dimensional rather than one-dimensional. Whereas sheet materials 711 of FIG. 1 through FIG. 5 restricts image transmission within a limited angle only from right to left, there is substantially no such limitation in other directions. Sheet material 151 of FIG. 6 has two-dimensional limited image transmission capability, both within angles to the right and left and angles up and down. The sheet material of FIG. 6 is useful in packaging applications similar to those previously described, solar energy control applications, and in other applications. The exemplary dimensions of Table I or Table II are also applicable to the system of FIG. 6.

Figure 7:
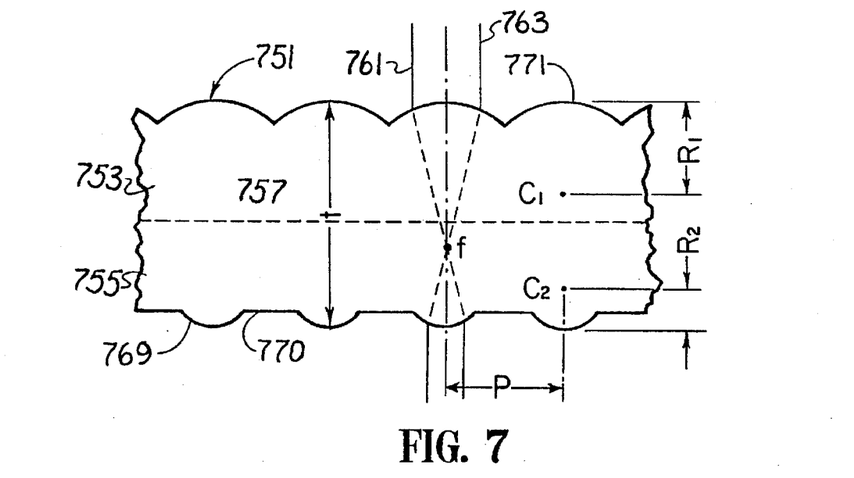
FIG. 7 is a sectional view of still another alternative form of sheet material employing Keplerian rather than Galilean telescope principles.
Figure 8:
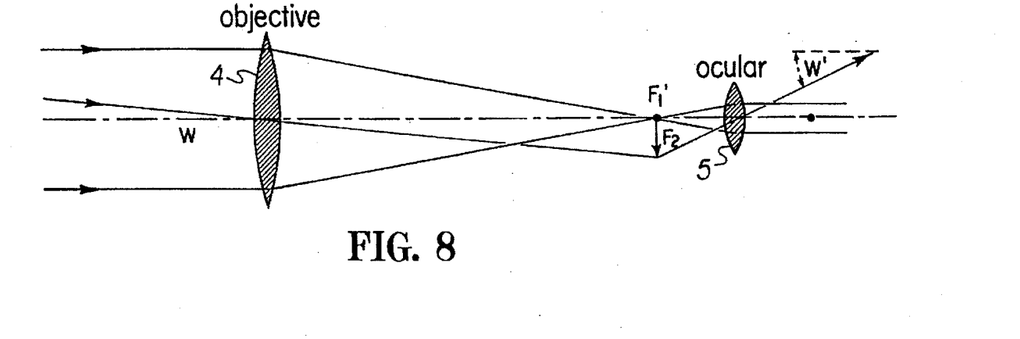
FIG. 8 shows a prior art Keplarian telescope useful in explaining the operation of the sheet material of FIG. 7.

A further alternative embodiment of the invention is illustrated in FIG. 7, an understanding of which will be aided by reference to FIG. 8 showing the basic configuration of a Keplerian telescope. The Keplerian telescope shown in FIG. 8 in diagrammatic form will be seen to consist of two convexo-convex converging lenses 4 and 5 rather than having one converging and one diverging lens, as does the Galilean telescope illustrated in FIG. 6. For focusing at infinity, the spacing between lenses in FIG. 8 is such that they are spaced apart by the sum of their focal lengths causing focal point $F_1'$ of the objective lens 4 to coincide with the focal point $F_2$ of the ocular lens 5.

A ray diagram shows that the normally observed angle of departure W of an object from the optical axis is substantially magnified to an angle W' with a ratio of magnification being equal to the ratio of focal lengths of the objective and ocular lenses. As was the case with the Galilean telescope form of optics, there is little or no significance to the magnification factor in the application of the Keplerian telescope form of objects to directional image transmission sheet material according to the invention. It will also be noted that contrary to the Galilean telescope, the Keplerian telescope produces an inverted image. It is believed that this will have an insignificant effect in the form of sheet material shown in FIG. 7 because the total image viewed by the observer is made up of hundreds of tiny line images so that the inversion of each line image would be unobserved as a practical matter.

Referring now to FIG. 7, sheet material 751 is shown formed of two layers of transparent plastic material 753 and 755 joined along a dot-dash line 757 as by fusing or adhering the two different materials together.

The top or front surface of sheet material 751 comprising layer 753 has formed therein a multiplicity of convex lens surfaces 771 very similar in form and function to the lenses 711 of FIG. 1. On the bottom or back surface of sheet material 751 formed by layer 755 there are formed a multiplicity of small radius convex lenses 769 which are separated by substantially flat surfaces 770.

Each pair of lenses consisting of one large convex lens 771 and one small convex lens 769 functions as a Keplerian telescope. In the preferred embodiments the lenses 771 and 769 will be configured so that the focal points of the lenses coincide as shown at f with the result that the Keplerian telescope will be focused at infinity and parallel rays 761 and 763 converging at point f will thereafter diverge before reaching lens 769 where they will be converged to parallelism. Pertinent points and dimensions on FIG. 7 are indicated by reference letters corresponding to those in FIG. 1 with P indicating pitch, $C_1$ and $C_2$ indicating centers of curvature of lenses, and $R_1$ and $R_2$ indicating lens effective radii of curvature; thickness of sheet material 751 at its thickest points is designated t. The distance D between centers may be calculated; $D=t-(R_1+R_2)$.

The function and operation of sheet material 751 shown in FIG. 7 will be generally similar to that of sheet material 711 shown in FIG. 1 as it has thus far been described. One notable difference is that when viewed from the top or front side through lenses 771, the flat spaces 770 are somewhat beyond the focal point F of lenses 771, and, hence, any imprint on flat surfaces 770 will be out of focus. Thus, for use in packaging film as illustrated in FIGS. 2 and 3, there would be a slight disadvantage for the alternative embodiment of FIG. 7. Another disadvantage in use of the alternative embodiment of FIG. 7 where patterns are to be imprinted on flat surfaces 770 is the fact that such flat surfaces are recessed between the projecting convex lenses 769, substantially precluding the use of common conventional printing techniques which can be employed with sheet material 711 shown in FIGS. 1, 2, and 3. Sheet 751 also has a possible disadvantage in having focal point f within the sheet 751.

FIG. 7 shows a feature for sheet material 751 which was not illustrated in connection with the description of sheet material 711 in FIGS. 1, 2, and 3, although such a feature could be incorporated there if desired. By forming the sheet material 751 of two different layers 753 and 755, one can select the materials of layer 753 and 755 to have different optical properties, particularly the property of dispersion. Thus, one can utilize the known optical design techniques of using different materials with different optical properties to overcome deficiencies caused by the phenomenon of chromatic aberration. It should be noted that while this feature of two layers of sheet material with different optical properties was not illustrated in connection with any of the embodiments of FIGS. 1–6 for the sake of simplicity, two layer materials could be employed as described with reference to FIG. 7 in the sheet material 711 of FIGS. 1–3 or any of the other sheet materials previously described.

TABLE 1 below gives exemplary dimensions for sheet materials of FIGS. 1–6 (which normally would not be suitable for the Keplerian or convexo-convex form of sheet material illustrated in FIG. 7).

TABLE 2 below gives exemplary dimensions particularly suitable for the form of sheet material of FIG. 7. TABLE 2 dimensions would not normally be suitable for sheet materials such as illustrated in FIG. 1 having a convexo-concave lens system or in the sheet materials illustrated in FIG. 5 and in FIG. 6. If any of the sheet material, particularly that of FIG. 6, was modified to the Keplerian form illustrated in FIG. 7 then the exemplary dimensions of TABLE 2 would be applicable.

The configuration of the sheet material 711 as shown in FIG. 1, or sheet material 25 as shown in FIG. 5, is particularly well suited to economical manufacture because registration between convex lenses 721 forming projections, and concave lenses 719 forming indentations can be assured in a single embossing operation by which the sheet material 711 or 25 may be formed.

Figure 9:
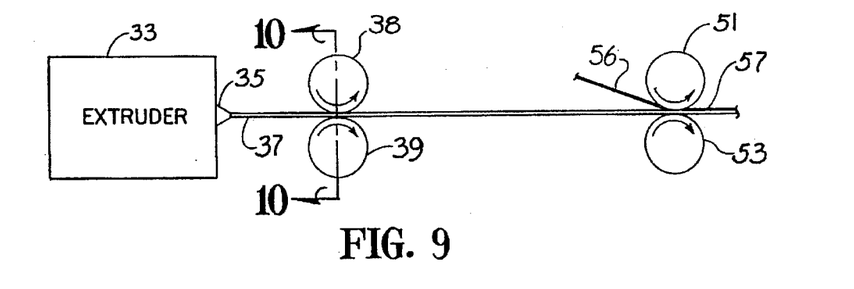
FIG. 9 is a partially schematic illustration of apparatus for producing sheet material according to the invention by a roll embossing process.
Figure 10:
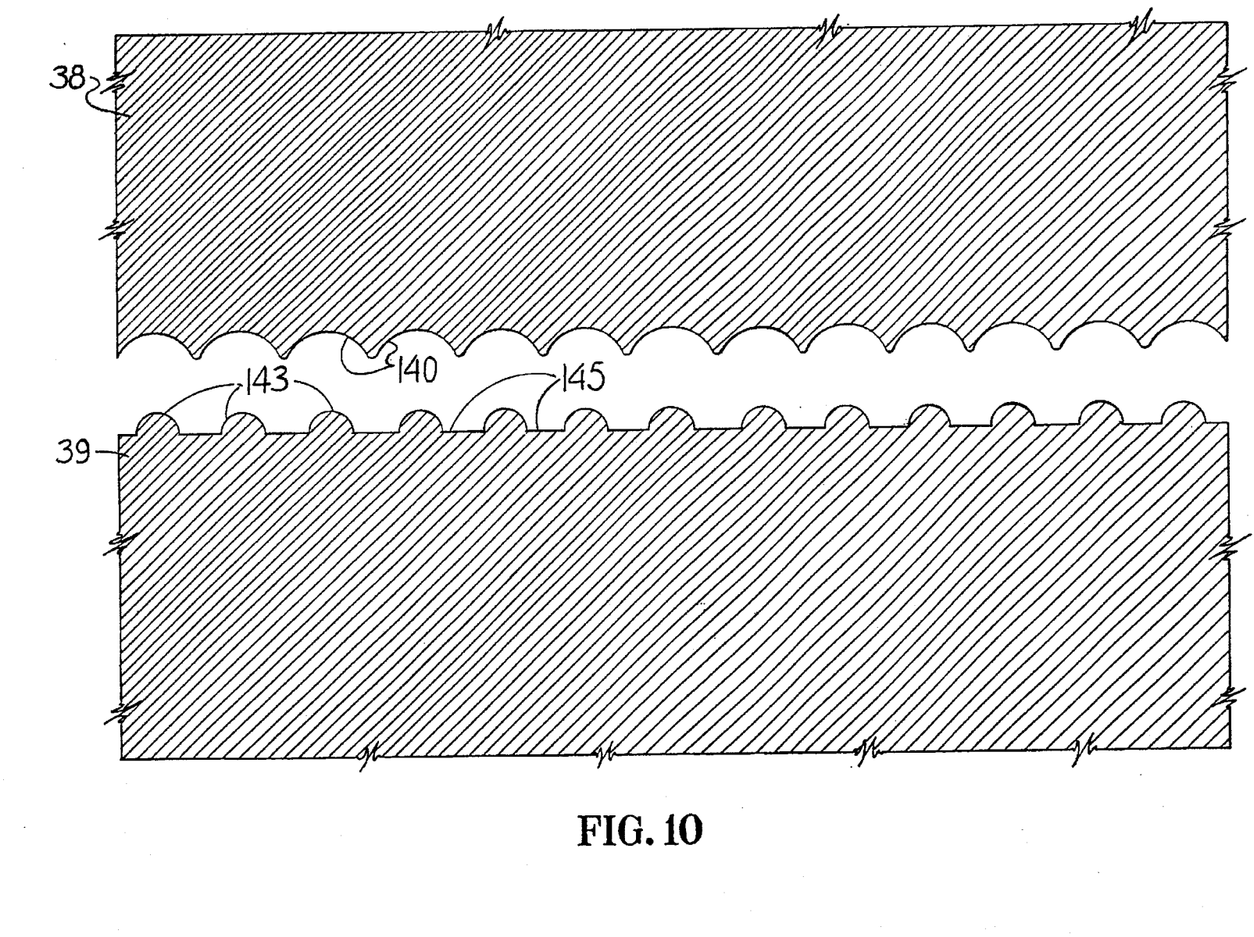
FIG. 10 is a greatly enlarged fragmentary sectional view of the embossing roll portion of the apparatus of FIG. 9.

FIG. 9 shows a schematic illustration of a configuration of generally conventional manufacturing apparatus which is suitable for forming sheet material 711 or 25 as shown in FIG. 1 or FIG. 5, for example. A sheet extruder 33 of conventional form extrudes a thin sheet 37 of plastic sheet material through a nozzle 35. The sheet 37 may be from about one foot to several feet in width, and, for example, may be about 0.04 inches (1 millimeter) thick. The sheet 37 passes immediately to embossing rollers 38 and 39 which are chilled rollers typically having a configuration as shown in FIG. 10 thereby shaping the sheet 37 in a manner similar to that shown for sheet 711 in FIG. 1. Alternatively, the extrusion process could be carried out separately and sheet 37 (if a thermoplastic material) could be reheated before passing through rollers 38 and 39 for the embossing process.

As shown in FIG. 10 it is preferred that embossing is done to produce the elongated lenses 721 generally parallel to the direction of travel of sheet 37. Thus, it is a simple matter to control registration of concave lens indentations 719 relative to lenses 721 by adjusting and fixing the relative position of arcuate grooves 140 relative to projections 143 as shown in FIG. 10. Embossing rollers such as 38 and 39 are sometimes machined with a helical cut for production of grooves 140 and projections 143, in which case the direction of the cuts, their pitch and the diameters of rolls 39 and 41 must be matched so that the registration will be maintained as rolls 39 and 41 turn at the same speed in opposite directions. Of course, if the grooves 140 and the projections 143 are cut as a series of circular elements rather than helically, the relative rotational position or diameters of rolls 38 and 39 is of no consequence.

It may be desired to provide additional cooling (not shown in FIG. 9) for sheet 37 after passing through rolls 38 and 39. In some cases it may be desired to provide sheet 37 with a film backing to create a generally flat surface on one side of the finished sheet material. It may be convenient to apply a backing sheet 56 in a continuous operation. A backing sheet 56 is laid down on sheet 37 from a supply roll (not shown), after which the sheets are pressed together by nip rolls 51 and 53. Roll 53 is preferably provided with a cushioning pad 55 of rubber or other elastomeric material to prevent damage or distortion to the lens forming projections such as 721. The pressure between rollers 51 and 53 assures that adhesion of sheet 56 to sheet 37 is permanent to form composite sheet 57. Adhesion can be facilitated by heat or the application of adhesive if desired.

A preferred material for sheet 37 is polycarbonate plastic. Other suitable materials in particular circumstances may include polyvinyl chloride, pvc with UV inhibitors, acrylic plastic, and other thermoplastic or thermosetting transparent materials.

of total thickness. The thickness of the flat transparent sheet 56 may be about one-third of the thickness of sheet 37, but this dimension is variable within wide limits, and in many applications the sheet 56 would be omitted entirely.

Figure 11:
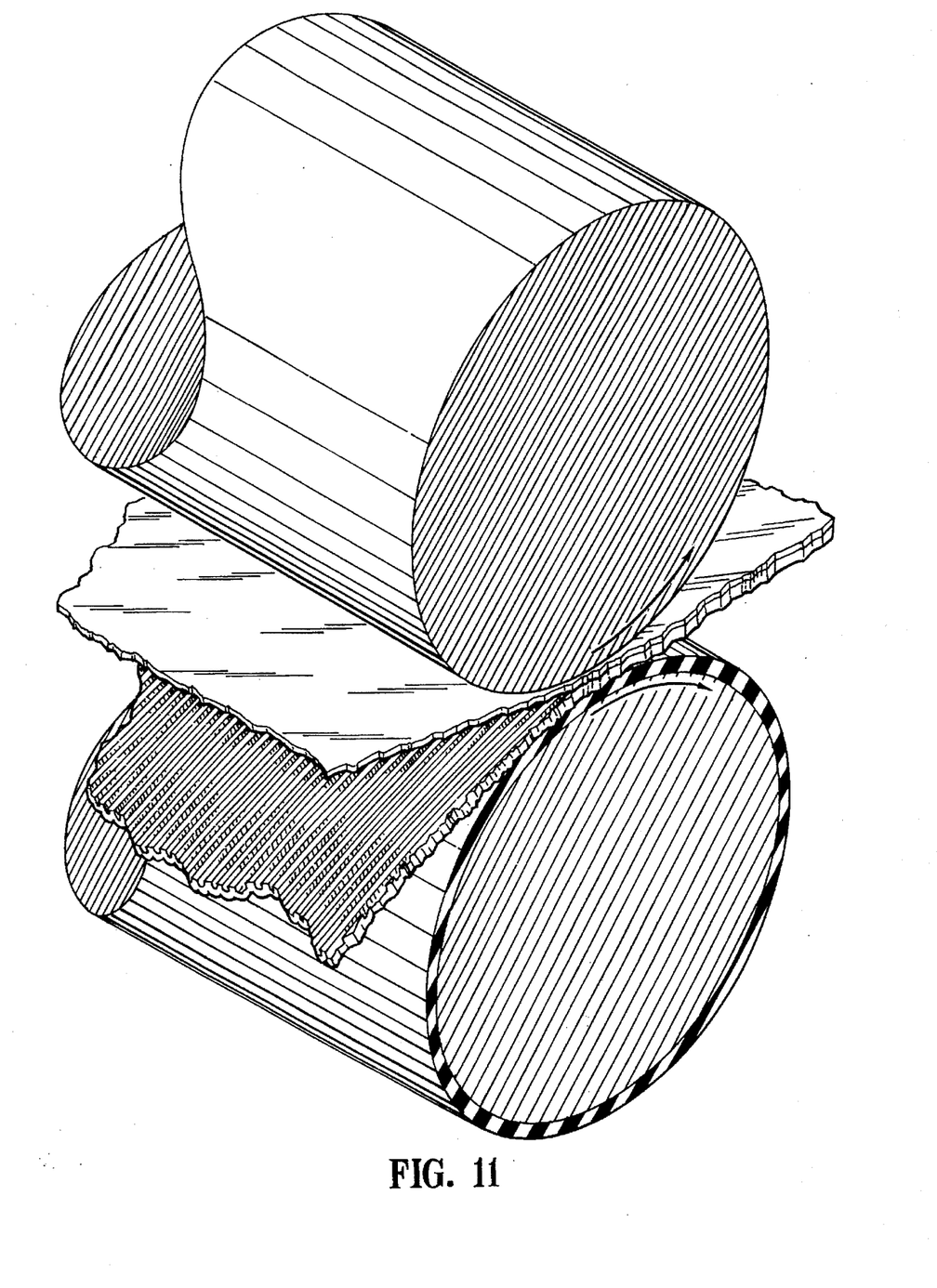
FIG. 11 is a fragmentary perspective, partially schematic, view of optional apparatus useful in producing an alternative form of sheet material according to the invention.

Thus, it will be seen from FIGS. 9, 10, and 11 that an important advantage of the configuration of sheet material shown in FIGS. 1 and 5 is the ease with which such film can be manufactured by generally conventional processes, and the fact that film having very small lenticular lens radii below 1.0 millimeter (0.04 inches) can be employed with ease because the lenses and the mask forming elements are produced and located in a single operation of embossing or the like. Alternatively, other processes than roll embossing may be used to form sheet material such as sheet 711, 25, 151, or 751 as convenient.

TABLE I

Concave with Convex

| REFRACTION INDEX (N) | PITCH (P) | EFFECTIVE RADII ($R_1,R_2$) | $C_1$ to $C_2$ DISTANCE (D) | TOTAL THICKNESS (t) | ANGULAR WIDTHS ($A_1,A_2$) | ASPHERICAL YES/NO |
|---|---|---|---|---|---|---|
| 1.5 | 0.2 mm | 0.2,–0.1 mm | 0.2 mm | 0.313 mm | 60°,60° | NO |
| 1.5 | 0.4 mm | 0.4,–0.2 mm | 0.4 mm | 0.62 mm | 60°,40° | NO |
| 1.5 | 0.4 mm | 0.4,–0.2 mm | 0.4 mm | 0.627 mm | 60°,60° | YES |
| 1.5 | 0.6 mm | 0.6,–0.3 mm | 0.6 mm | 0.96 mm | 60°,90° | YES |
| 1.5 | 0.6 mm | 0.6,–0.3 mm | 0.6 mm | 0.94 mm | 90°,60° | NO |
| 1.586 | 0.1083" | 0.0625,–.03125" | 0.050" | 0.0969" | 120°,120° | NO |
| 1.566 | 0.0884" | 0.0625,–.03125" | 0.045" | 0.0854" | 90°,90° | NO |
| 1.586 | 0.0304" | 0.025,–.0125" | 0.020" | 0.0351" | 75°,75° | NO |
| 1.586 | 0.025" | 0.025,–.0125" | 0.020" | 0.0351" | 60°,75° | NO |
| 1.586 | 0.025" | 0.025,–.0125" | 0.205" | 0.0356" | 60°,75° | NO |
| 1.586 | 0.025" | 0.025,–.015" | 0.016" | 0.0291" | 60°,75° | NO |

TABLE II

Convex with Convex

| REFRACTION INDEX (N) | PITCH (P) | EFFECTIVE RADII ($R_1,R_2$) | $C_1$ to $C_2$ DISTANCE (D) | TOTAL THICKNESS (t) | ANGULAR WIDTHS ($A_1,A_2$) | ASPHERICAL YES/NO |
|---|---|---|---|---|---|---|
| 1.5 | 0.2 mm | 0.2,0.1 mm | 0.6 mm | 0.9 mm | 60°,60° | NO,NO |
| 1.5 | 0.6 mm | 0.6,0.2 mm | 1.6 mm | 2.4 mm | 60°,90° | NO,YES |
| 1.6,1.4 | 0.4 mm | 0.4,0.2 mm | 1.2 mm | 1.8 mm | 60°60° | YES,NO |
| 1.5 | 0.41 mm | 0.8,0.6 mm | 2.8 mm | 4.2 mm | 30°,30° | NO,NO |

Suitable compositions for opaque mask material 47 may include polyether plastics, cellulosic plastics, or one of the above mentioned plastics with a dye or coloring agent dispersed therein such as calcium carbonate, magnesium oxide, or other conventional white pigment or dye.

Plastic sheet 56 is preferably formed of the same material as plastic sheet 37, or may alternatively be formed of polyvinyl chloride, acetates, polyethylene, polypropylene, or acrylic plastics The sheet 711 in FIG. 1 may have a total thickness indicated at t from 0.004 inches (0.1 millimeters) to 0.2 inches (5 millimeters). Typically the effective radius of curvature of the lenses 721 formed in sheet 711 will be about ½ to ⅔ of such total thickness. Lenses 771 in sheet material 751 (FIG. 7) typically will have effective radii about ⅙ to ⅓

It should be noted that the sheet 56 which optionally is laminated to sheet 711, sheet 25, sheet 151 or sheet 751 may be applied on either side of sheet 711 (or one of the other sheets) to form a composite sheet 57 as illustrated in FIG. 9. For clarity and simplicity the addition of a transparent sheet of uniform thickness such as sheet 56 is not illustrated in FIG. 1, FIG. 5, FIG. 6, or FIG. 7. It is apparent, however, that the lamination of such a sheet over either one of the convex lens surfaces or one of the concave lens surfaces will provide a substantially flat exterior surface for the sheet material which may be desirable in some cases. In addition, particularly when the sheet is applied over the surface having convex lenses formed therein, a significant dead-air space will be provided that will increase the thermal insulating properties of the composite sheet 57 formed of embossed sheet 37 and uniform thickness sheet 56. If desired, a further sheet of uniform thickness similar to sheet 56 could be applied to the opposite surface of sheet 37 thereby forming a sheet material of three layers with substantially smooth flat surfaces on both sides.

From the foregoing description and explanation, it will be seen that the invention provides a directional image transmission sheet and a particular process for making such sheet which has advantageous features for a wide variety of uses including such diverse uses as wrapping film and solar energy control sheet material for incorporation in siding or windows for buildings or other structures. In addition to the modifications and variations to the invention shown, described or suggested above, it will be apparent to those skilled in the art that numerous other modifications may be made to better suit the uses or circumstances for which the sheet material is to be employed. Accordingly, the scope of the invention is not to be considered limited to those embodiments shown, described or suggested herein, but is to be determined with reference to the appended claims.

Although the theory of operation and design factors presented above is believed correct, the operability, utility, and advantages of sheet materials according to the invention should be based on actual results and performance thereof rather than upon theoretical principles or mathematical analysis.

What is claimed is:

1. A partially transparent sheet for directional light transmission and image viewing comprising:

a body of at least partially transparent solid material with a predetermined thickness substantially less than its other dimensions, and having a front surface and a back surface, a multiplicity of convex lenses with a predetermined index of refraction covering a substantial area on said body front surface with each of said lenses having a least transverse dimension of less than two millimeters, the effective radius of curvature of said convex lenses being from 0.01 millimeter to 2.0 millimeters, and a multiplicity of concave lenses with a predetermined index of refraction on said body back surface, each being generally in register with a respective one of said convex lenses, the least transverse dimension of said concave lenses being less than the center to center pitch thereof, the radii of curvature of said concave lenses being selected with regard to the radii of curvature of said convex lenses, said index of refraction, and said body thickness to cause parallel rays converged by said convex lenses to be returned approximately to parallelism upon passing through said concave lenses, whereby said sheet when viewed in a direction nearly parallel with the paths from lenses on the front surface to corresponding lenses on the back surface appears transparent and transmits a substantially undistorted image, while said sheet appears non-transparent to images when viewed in a substantially different direction.

2. A sheet as recited in claim 1 wherein said at least partially transparent solid material is a flexible sheet of plastic with a thickness of from 0.02 to 4.0 millimeters.

3. A sheet as recited in claim 2 wherein said convex lenses are formed integrally in said solid at least partially transparent material.

4. A sheet as recited in claim 2 wherein the least transverse dimension of said concave lenses is less than three-fourths of the center to center pitch thereof.

5. A sheet as recited in claim 1 wherein said convex lenses are formed integrally in said solid material.

6. A sheet as recited in claim 1 wherein said convex lenses and said concave lenses are lenticular lenses with substantially mutually parallel orientation.

7. A sheet as recited in claim 6 wherein the surfaces of said convex lenses have an elliptical cross-section.

8. A sheet as recited in claim 1 wherein the distance separating each said concave lens from its corresponding convex lens is between 0.8 times and 1.2 times the difference of the absolute values of the focal lengths thereof.

9. A partially transparent sheet for directional light transmission or image viewing comprising:

a body of at least partially transparent material with a predetermined thickness, and having a front surface and a back surface, a multiplicity of convex lenses with a predetermined index of refraction and focal length on said body front surface with each of said lenses having a least transverse dimension of less than two millimeters and with the space between adjacent ones of said lenses being from zero to one-half millimeter, the effective radius of curvature of said convex lenses being from 0.01 millimeter to 2.0 millimeters, and a multiplicity of secondary lenses with a predetermined index of refraction and focal length on said body back surface generally in register with respective ones of said convex lenses, the least transverse dimension of said secondary lenses being less than ¾ of the center to center pitch thereof, the radii of curvature of said secondary lenses being selected with regard to the radii of curvature of said convex lenses, each said index of refraction, and said body thickness to cause the distance separating each secondary lens from its corresponding convex lens to be between 0.8 times and 1.2 times the algebraic sum of the focal lengths thereof, whereby said sheet when viewed in a direction nearly parallel with the paths from lenses on the front surface to corresponding lenses on the back surface appears transparent and transmits a substantially undistorted image, while said sheet appears non-transparent to images when viewed in a substantially different direction.

10. A sheet as recited in claim 9 wherein said solid material is a sheet of transparent plastic with a thickness of from 0.01 to 2.0 millimeters.

11. A sheet as recited in claim 10 wherein said sheet is flexible and said convex lenses are formed integrally in said solid material.

12. A sheet as recited in claim 11 wherein the surfaces of said convex lenses have an elliptical cross-section.

13. A partially transparent sheet for directional image viewing comprising:

a body of at least partially transparent solid material having a front surface and a back surface, a multiplicity of convex lenses of a predetermined focal length on said body front surface with each of said lenses having a least transverse dimension of less than two millimeters and with the space between adjacent ones of said lenses being from zero to one-half millimeter, the radius of curvature of said convex lenses being from 0.01 millimeter to 2.0 millimeters, and a multiplicity of secondary lenses on said body back surface, the focal length of said secondary lenses being determined with regard to said body thickness to cause focal points of said secondary lenses to approximately coincide with focal points of said convex lenses, the least transverse dimension of said secondary lenses being less than ¾ of the center to center pitch thereof, whereby parallel rays converged by said convex lenses are returned approximately to parallelism upon passing through said secondary lenses, and whereby said sheet when viewed in a direction nearly parallel with the paths from lenses on the front surface to corresponding lenses on the back surface appears transparent and transmits a substantially undistorted image, while said sheet appears non-transparent to images when viewed in a substantially different direction.

14. A sheet as recited in claim 13 wherein said solid material is a flexible sheet of plastic with a thickness of from 0.01 to 2.0 millimeters.

15. A sheet as recited in claim 14 wherein said convex lenses are formed integrally in said solid material.

16. A sheet as recited in claim 13 wherein said convex lenses are formed integrally in said solid material.

17. A sheet as recited in claim 13 wherein said convex lenses and said secondary lenses are lenticular lenses with substantially parallel orientation.

18. A partially transparent sheet for directional light transmission and image viewing comprising:

a body of at least partially transparent solid material with a predetermined thickness substantially less than its other dimensions, and having a front surface and a back surface;

a multiplicity of aspheric lenses with a predetermined index of refraction covering a substantial area on said body front surface with each of said lenses having an elliptical cross-section convex surface and a transverse dimension of less than two millimeters;

the effective radius of curvature of said convex lenses being from 0.01 millimeter to 2.0 millimeters; and, a multiplicity of concave lenses with a predetermined index of refraction on said body back surface, each being generally in register with a respective one of said aspheric lenses, the radii of curvature of said concave lenses being selected with regard to the radii of curvature of said convex lenses, said index of refraction, and said body thickness to cause parallel rays converged by said convex lenses to be returned approximately to parallelism upon passing through said concave lenses, whereby said sheet when viewed in a direction nearly parallel with the paths from lenses on the front surface to corresponding lenses on the back surface appears transparent and transmits a substantially undistorted image, while said sheet appears non-transparent to images when viewed in a substantially different direction.

19. A sheet as recited in claim 18 wherein the surfaces of said concave lenses have an elliptical cross-section.

* * * * *

UNITED STATES PATENT AND TRADEMARK OFFICE
CERTIFICATE OF CORRECTION

PATENT NO. : 5,644,431
DATED : July 1, 1997
INVENTOR(S) : John Allan MAGEE

It is certified that error appears in the above-indentified patent and that said Letters Patent is hereby corrected as shown below:

Col. 1, line 23, delete "light:" and substitute --light-- therefor;

Col. 4, line 6, delete "under,stood" and substitute --understood-- therefor;

Col. 6, line 16, delete ";" after "effects";

Col. 11, ["REFRACTION INDEX (N)"] of TABLE I, delete "1.566" and substitute therefor --1.586--;

Col. 13, line 2 of claim 3, delete "solid" and reinsert it on line 4 of claim 3 between "parent" and "material";

Col. 14, line 1 of claim 10, between "said" and "solid" insert --at least partially transparent--; and Col. 15, line 1 of claim 14, between "said" and "solid" insert --at least partially transparent--.

Signed and Sealed this

Second Day of December,1997

*Attest:*

BRUCE LEHMAN

*Attesting Officer*   Commissioner of Patents and Trademarks